(12) United States Patent
Duncan

(10) Patent No.: US 6,176,534 B1
(45) Date of Patent: Jan. 23, 2001

(54) INTEGRAL CENTER STACK STORAGE DOOR FOR INSTRUMENT PANEL ASSEMBLY

(75) Inventor: Terence M. Duncan, Farmington Hills, MI (US)

(73) Assignee: Lear Corporation, Southfield, MI (US)

( * ) Notice: Under 35 U.S.C. 154(b), the term of this patent shall be extended for 0 days.

(21) Appl. No.: 09/365,005

(22) Filed: Aug. 2, 1999

(51) Int. Cl.[7] .............................. B60N 3/00; B60K 37/00
(52) U.S. Cl. ...................... 296/37.12; 296/37.8; 296/70; 454/75
(58) Field of Search ............................... 296/37.12, 37.8, 296/70; 180/90; 454/69, 75

(56) References Cited

U.S. PATENT DOCUMENTS

| | | | |
|---|---|---|---|
| D. 401,545 | * 11/1998 | Sacco et al. ........................ | D12/192 |
| D. 413,095 | * 8/1999 | Abalos et al. ....................... | D12/192 |
| 2,091,059 | 8/1937 | Tjaarda . | |
| 2,202,277 | 5/1940 | Visser . | |
| 3,039,642 | 6/1962 | Perkins . | |
| 3,049,188 | * 8/1962 | Giannetti .......................... | 296/37.12 |
| 3,061,394 | 10/1962 | Whetstone . | |
| 3,390,309 | 6/1968 | McGrew, Jr. . | |
| 3,403,830 | 10/1968 | Jones et al. . | |
| 3,606,447 | * 9/1971 | Ryding .............................. | 296/37.12 |
| 4,087,126 | 5/1978 | Wynn . | |
| 4,241,870 | * 12/1980 | Marcus ................................ | 296/37.8 |
| 4,706,810 | 11/1987 | Petrilli . | |
| 4,779,923 | 10/1988 | Lang et al. . | |
| 5,050,922 | 9/1991 | Falcoff . | |
| 5,088,571 | * 2/1992 | Burry et al. ............................ | 180/90 |
| 5,102,181 | * 4/1992 | Pinkney ............................. | 296/37.12 |
| 5,207,471 | 5/1993 | Mutschler et al. . | |
| 5,213,243 | * 5/1993 | Landon ............................... | 296/37.8 |
| 5,282,556 | * 2/1994 | Bossert .............................. | 296/37.8 |
| 5,364,159 | * 11/1994 | Kelman et al. ...................... | 296/192 |
| 5,522,638 | * 6/1996 | Falcoff et al. ....................... | 296/37.8 |
| 5,712,764 | * 1/1998 | Baker et al. .......................... | 361/690 |
| 5,743,585 | * 4/1998 | Pranger et al. .................... | 296/37.12 |
| 5,823,599 | 10/1998 | Gray . | |
| 5,823,612 | * 10/1998 | Angelo .............................. | 296/37.12 |
| 5,856,908 | * 1/1999 | Takiguchi et al. ................... | 361/690 |
| 5,873,749 | * 2/1999 | Takiguchi et al. ................... | 439/534 |
| 6,003,925 | * 12/1999 | Litke et al. ......................... | 296/37.8 |
| 6,048,020 | * 4/2000 | Gronowicz et al. .................. | 296/70 |

\* cited by examiner

Primary Examiner—D. Glenn Dayoan
Assistant Examiner—Hilary Gutman
(74) Attorney, Agent, or Firm—Brooks & Kushman P.C.

(57) ABSTRACT

A vehicle instrument panel includes a movable storage bin positioned in a center stack area of the instrument panel. The storage bin is movable between a closed position for storage and an open position for convenient driver access. The movable storage bin includes a faceplate having vehicle system controls exposed thereon, such as radio and HVAC controls. The radio or other electronic components associated with the system controls are preferably mounted elsewhere in the vehicle, and connected by flex cable, flat wire or transmitted signals to the system controls.

8 Claims, 3 Drawing Sheets

1

INTEGRAL CENTER STACK STORAGE DOOR FOR INSTRUMENT PANEL ASSEMBLY

TECHNICAL FIELD

The present invention relates to an integral center stack storage door to provide convenient driver access in a vehicle instrument panel assembly.

BACKGROUND ART

Traditionally, the glove box is used to conceal stored items within the instrument panel of a vehicle. Glove boxes are positioned on the passenger side of the vehicle. This makes access by the driver difficult, and impossible when the vehicle is moving.

In the "center stack" area of the vehicle instrument panel, which is the center of the instrument panel, numerous vehicle interior systems are "stacked", such as the radio and HVAC (heating ventilation and air conditioning) systems and their respective controls, and sometimes a clock or other features. Moving the storage bin closer to the driver is difficult due to the location of the center stack. Some designs have addressed this problem by placing a storage compartment below the center stack, but this arrangement is so low in the vehicle that accessing items from this position takes the driver's eyes off the road for an extended period of time, which is, of course, undesirable.

Therefore, it is desirable to provide concealed storage closer to the driver in a vehicle in a position which provides the driver with easy access to the contents of the storage area while seated in the driver seat.

DISCLOSURE OF INVENTION

The present invention overcomes the above-referenced problems associated with prior instrument panel assemblies by providing a storage bin within the center stack area of the vehicle instrument panel. This provides storage space for frequently accessed items, such as CDs, cassettes, maps, sunglasses, tissue, etc., in a position which is very close to the driver and in a configuration in which opening the door does not infringe upon the passenger's knee space.

More specifically, the present invention provides a vehicle instrument panel assembly including a movable storage bin positioned in a center stack area of the instrument panel and movable between a closed position for storage and an open position for convenient driver access. The movable storage bin includes a faceplate having vehicle system controls exposed thereon. Preferably, the faceplate contains HVAC controls, radio controls and a clock. The actual radio and other components would be mounted elsewhere in the vehicle and connected to the controls on the faceplate by a conventional wiring harness, a flex cable, flat wire, or by transmitted R.F. signals.

Accordingly, an object of the invention is to provide storage for frequently accessed items in a position which is easily accessible to the driver of a vehicle.

A further object of the invention is to provide a large storage bin in a center stack area of an instrument panel.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
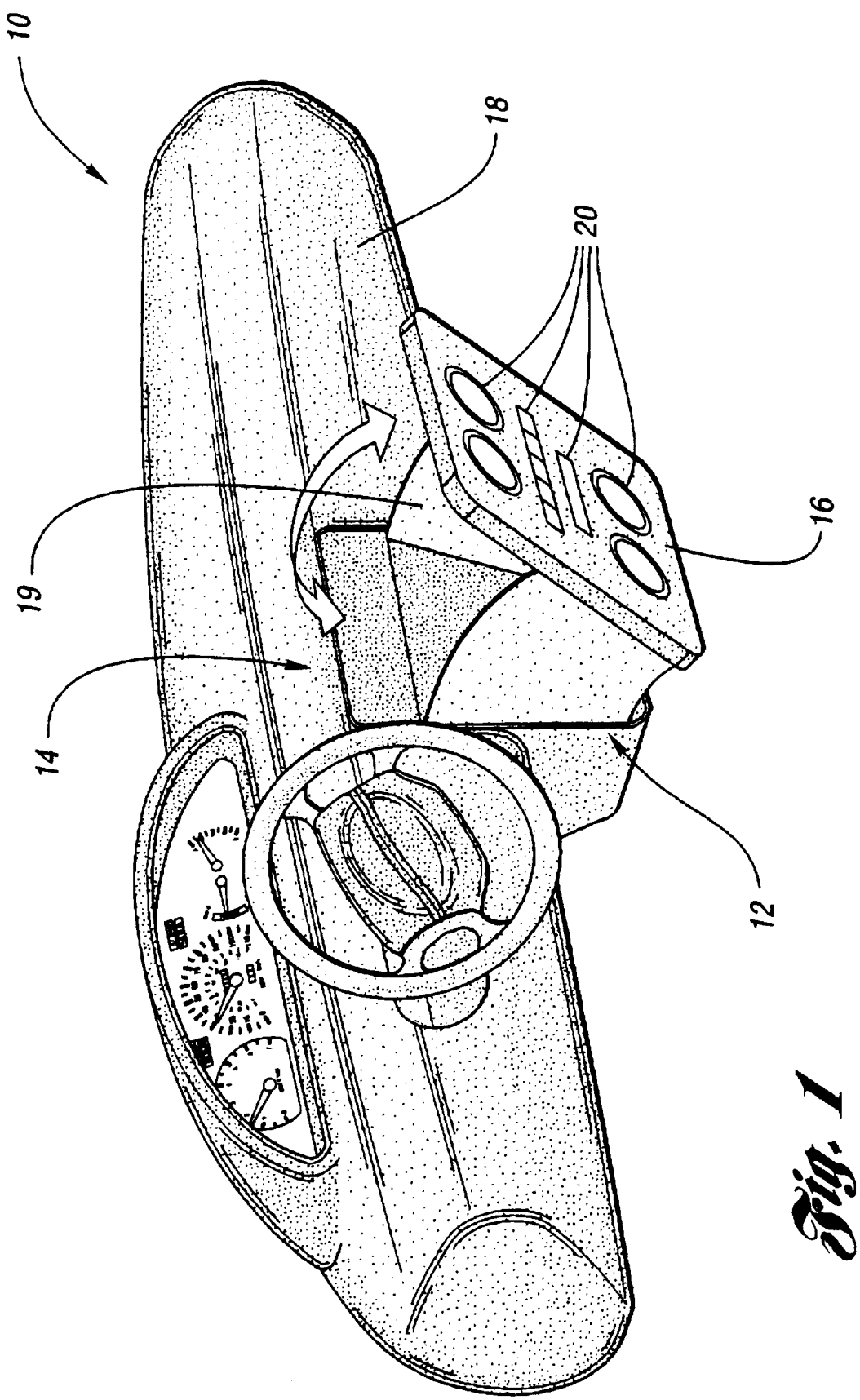
FIG. 1 shows a perspective view of a vehicle instrument panel assembly incorporating a movable storage bin in accordance with the present invention.

Referring to FIG. 1, a vehicle instrument panel assembly 10 is shown in accordance with the present invention. The instrument panel assembly 10 includes a movable storage bin 12 positioned in a "center stack" area 14 of the instrument panel assembly 10. The "center stack" area 14 is generally the center of the instrument panel assembly 10.

The storage bin 12 is movable between a closed position in which the faceplate 16 is positioned against the instrument panel 18 for storage, and an open position, as shown in FIG. 1 to provide driver access to the interior 19 of the bin 12. By positioning the storage bin 12 in the center stack area 14, it is easily accessible by the driver and it does not interfere with the knees of the driver or passenger when opened.

The front portion of the bin 12 includes a faceplate 16 having electronic vehicle system controls 20 exposed thereon for driver access. The vehicle system controls 20 may include radio controls, HVAC (heating ventilation and air conditioning) controls, defog switches, rear wiper switches, hazard switches, etc. Also, a clock, navigation device, or other features may be positioned on the faceplate as desired. The storage bin 12 and faceplate 16 are preferably injection molded plastic.

Figure 2:
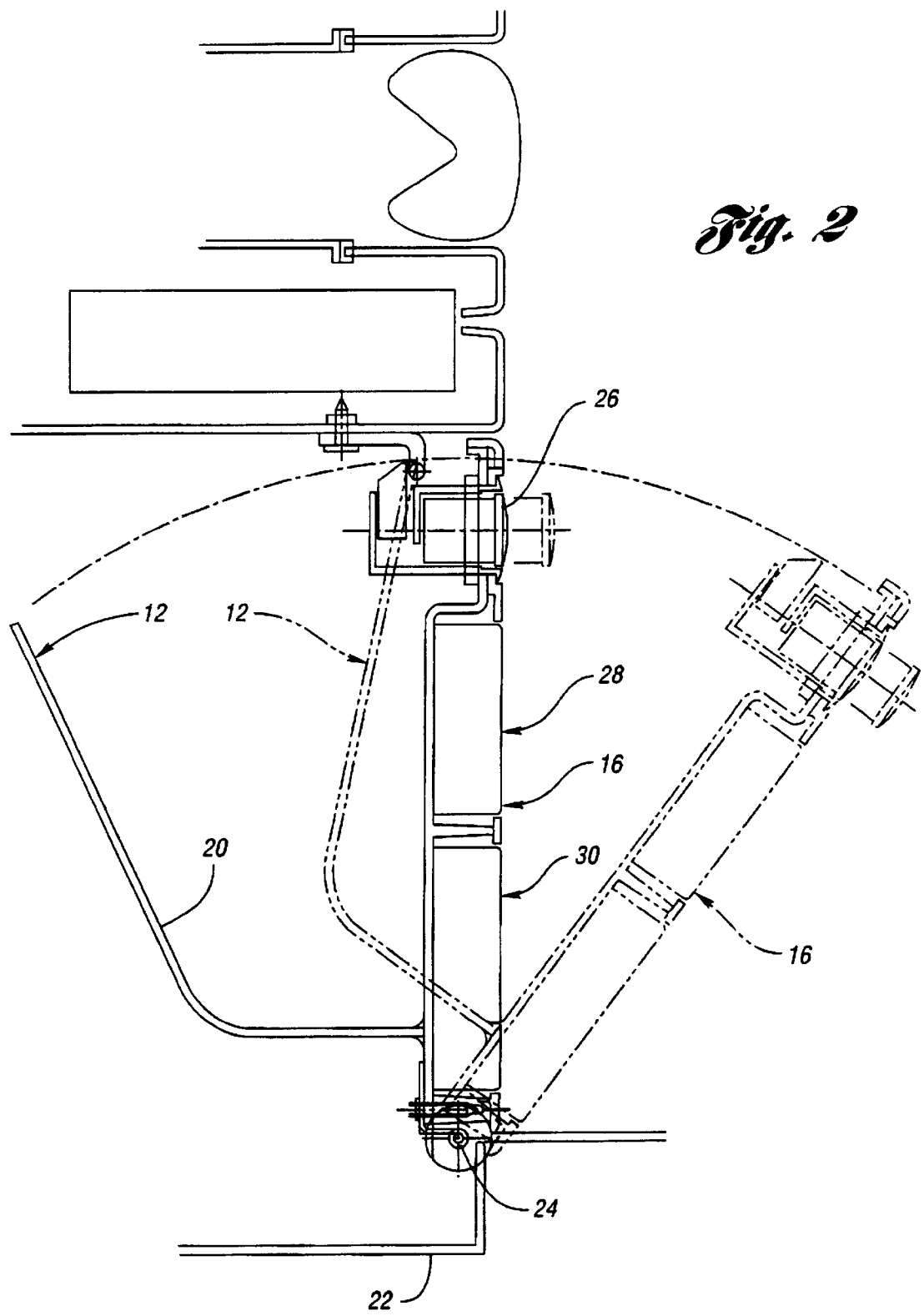
FIG. 2 shows a vertical cross-sectional view of the assembly of FIG. 1.

The storage bin 12 may be pivotally connected to the instrument panel assembly 10, or may be slidable along guide tracks with respect to the instrument panel. As shown in FIG. 2, in the preferred embodiment the storage bin 12 is pivotally connected to a vehicle instrument panel component 22 at a pivot joint 24. As shown, the storage bin 12 is pivotable about the pivot joint 24 between the closed position, and the open position shown in phantom in FIG. 2. The storage bin 12 is also provided with a release button 26 to facilitate unlocking the bin to allow such pivotal movement.

As shown, the faceplate 16 includes spaces 28,30 which house vehicle system controls and their corresponding circuitboards. The actual components, such as the radio, are positioned elsewhere in the vehicle, and connected to the system controls 20 by a flex cable, flat wire, or transmitted R.F. signals.

Figure 3:
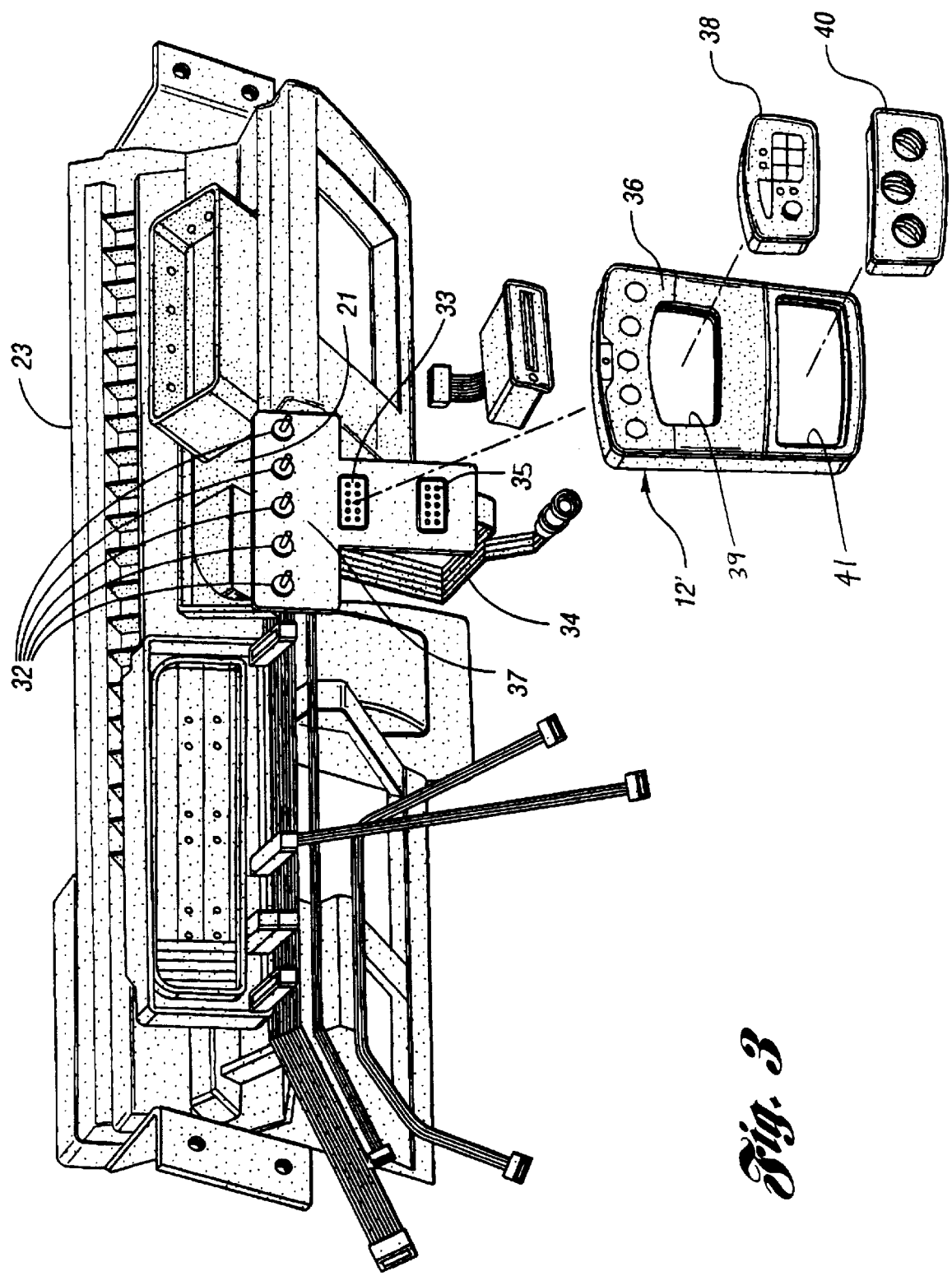
FIG. 3 shows a partially exploded perspective view of a vehicle instrument panel assembly in accordance with an alternative embodiment of the present invention.

In a slightly modified alternative embodiment, as shown in FIG. 3, various switches 32, a radio connector 33 and HVAC connector 35 are mounted to a flexible circuit board 37, and are connected via a flex cable 34 to their respective electronic components. By housing the actual components, such as the radio, etc. under the seat, in the trunk, elsewhere in the instrument panel assembly, etc., and by having only the control features and the connectors 33,35 on the circuit board 37, substantial space is saved. FIG. 3 also shows a cover plate 36 for the bin 12' and includes modular radio and HVAC controls 38,40, which are connected to the radio and HVAC connectors 33,35, respectively, on the flexible circuit board 37 through the openings 39,41 formed in the cover plate 36.

As further shown in FIG. 3, a cutout area 21 in the instrument panel component 23 forms an opening for receiving the storage bin 12'.

While the best mode for carrying out the invention has been described in detail, those familiar with the art to which this invention relates will recognize various alternative designs and embodiments for practicing the invention within the scope of the appended claims.

What is claimed is:

1. A vehicle instrument panel assembly comprising:

a movable storage bin positioned in a center stack area of the vehicle instrument panel assembly for a vehicle and movable between a closed position for storage and an open position for convenient driver access;

wherein said movable storage bin is pivotally connected to an instrument panel component about a horizontal axis of rotation;

wherein said movable storage bin includes a front portion having vehicle system controls exposed thereon;

wherein said vehicle system controls are accessible to vehicle occupants when the movable storage bin is in the open position and the closed position; and wherein said vehicle system controls are operatively connected to electronic equipment located elsewhere in the vehicle.

2. The vehicle instrument panel assembly of claim 1, wherein said vehicle system controls comprise radio and HVAC controls.

3. The vehicle instrument panel assembly of claim 1, further comprising an electrical flex cable operatively connected to said vehicle system controls.

4. The vehicle instrument panel assembly of claim 1, further comprising a release button positioned on the storage bin for selectively unlocking the storage bin for movement between said closed and open positions.

5. The vehicle instrument panel assembly of claim 1, wherein said storage bin comprises injection molded plastic.

6. A vehicle instrument panel assembly comprising:

a movable storage bin positioned in a center stack area of the vehicle instrument panel assembly for a vehicle and movable between a closed position for storage and an open position for convenient driver access;

wherein said movable storage bin is pivotally connected to an instrument panel component about a horizontal axis of rotation;

wherein said movable storage bin includes a face plate having controls exposed thereon for a radio and HVAC system;

wherein said controls are operatively connected to said radio and HVAC system, which are located elsewhere in the vehicle; and an electrical flex cable operatively connected to said controls.

7. The vehicle instrument panel assembly of claim 5, further comprising a release button positioned on the storage bin for selectively unlocking the storage bin for movement between said closed and open positions.

8. The vehicle instrument panel assembly of claim 5, wherein said storage bin comprises injection molded plastic.

* * * * *

UNITED STATES PATENT AND TRADEMARK OFFICE
CERTIFICATE OF CORRECTION

PATENT NO.    : 6,176,534 B1
DATED         : January 23, 2001
INVENTOR(S)   : Terence M. Duncan and James D. Dowd It is certified that error appears in the above-identified patent and that said Letters Patent is hereby corrected as shown below:

<u>Title page,</u>
Item [75], Inventors, should read as follows:
-- [75]   Inventor:      Terence M. Duncan, Farmington Hills, MI (US);
                         James D. Dowd, Farmington Hills, MI (US) --

Signed and Sealed this

Twenty-eighth Day of December, 2004

JON W. DUDAS
*Director of the United States Patent and Trademark Office*